Oct. 15, 1963   B. M. EVANS ETAL   3,107,291
ELECTRODE FEED APPARATUS
Filed Nov. 18, 1960   2 Sheets-Sheet 2
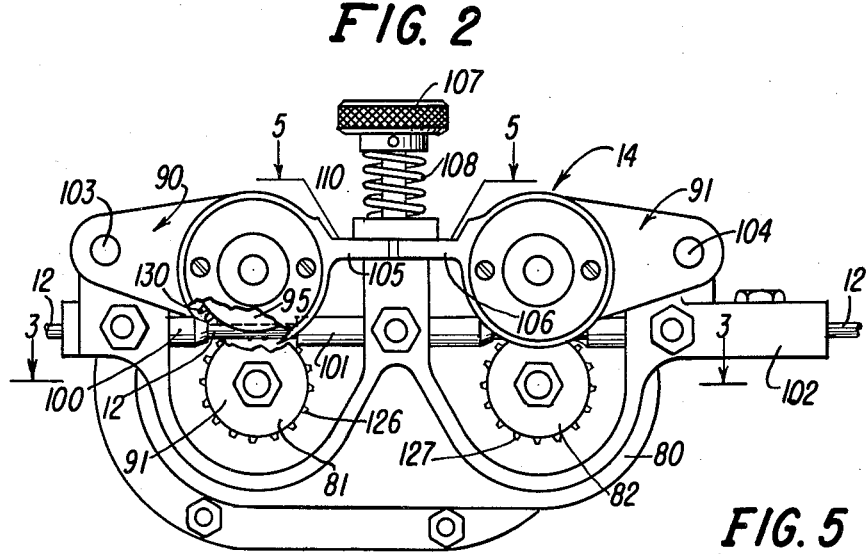
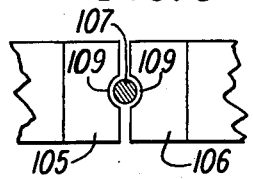
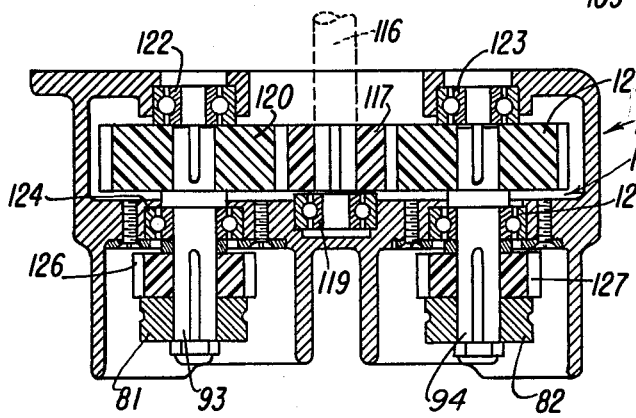
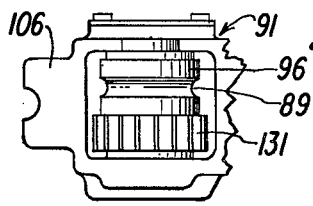
INVENTORS
Bruce M. Evans
BY Howard R. Adams
ATTY.

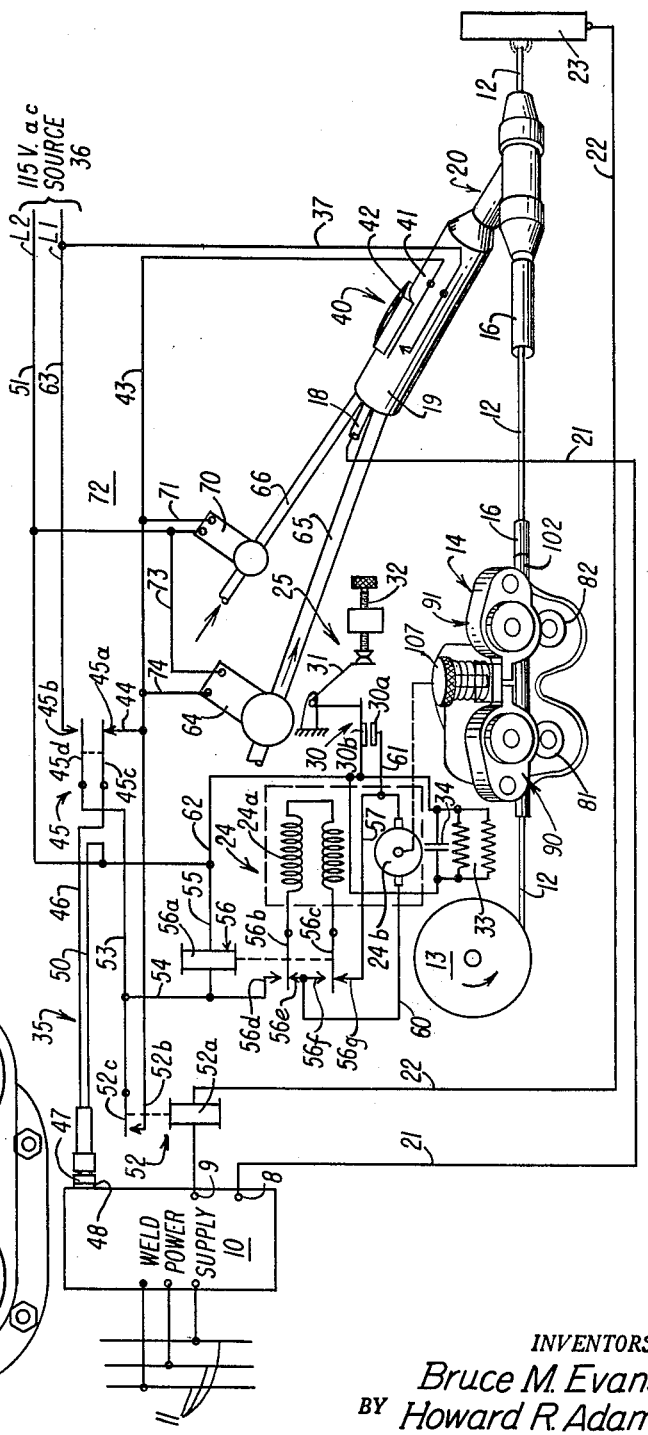

3,107,291
ELECTRODE FEED APPARATUS
Bruce M. Evans, Chicago, and Howard R. Adams, Roselle, Ill., assignors to Chemetron Corporation, Chicago, Ill., a corporation of Delaware
Filed Nov. 18, 1960, Ser. No. 70,185
10 Claims. (Cl. 219—130)

The present invention relates to electrode feed apparatus and more particularly to improved apparatus for feeding a consumable electrode to a welding arc.

Generally, in consumable electrode arc welding apparatus, the electrode is fed by a pair of motor driven rolls which grip the electrode to impart motion to it. Considerable pressure is applied to the pair of rolls so as to positively drive the electrode to the arc. If the electrode is soft as is often the case, the necessarily relatively large contact pressure per drive roll may cause "fiinning" of the electrode, resulting in jamming in the drive unit gear box and "burn back" in the guide tube.

It is therefore an important object of the present invention to remedy the problem referred to above by providing an improved, simple and positive drive means having less contact pressure per drive roll.

Another object of the invention is to provide means to straighten the electrode as it traverses the drive unit in order to eliminate the need for a conventional wire straightener.

In certain high current density arc welding processes, the electrode drive motor speed and therefore the electrode speed is maintained constant. When the weld period is terminated or otherwise interrupted, current to the motor is automatically stopped which in turn stops further feed of the electrode. However, due to the inertia of the motor, the rolls and coupling mechanism, the drive rolls continue to rotate for a relatively short period causing the electrode to feed to the work. This continued feed causes the electrode to feed beyond the end of the welding apparatus a distance directly dependent upon the inertia of the eelctrode feed mechanism and the rate at which the electrode is fed to the welding zones. In some cases, the electrode may extend several inches beyond the end of the welding apparatus, and, in others a distance of a foot or more.

As it is customary to have the electrode projecting approximately one half inch from the end of the arc welding apparatus when striking an arc, for purposes of convenience and accuracy it is necessary to cut off a portion of the extended electrode before initiating a subsequent weld. Where the arc welding apparatus and in particular the portion disposed adjacent the welding zone is not adapted to be moved to divert the electrode from the weld zone, the continued electrode feed may also result in electrode contacting and freezing or sticking to the work piece, thereby necessitating frequent delays and stoppages between welds. These conditions are particularly prevalent in those applications where the electrode is fed to the work at a relatively high rate of speed.

It is therefore a further object of this invention to remedy the problem referred to above by providing means for quickly decelerating the electrode drive motor at the termination of a weld period to thereby prevent continued electrode feed due to the inertia in the feeding mechanism.

In general, control apparatus associated with electrode feed apparatus has employed electronic components. In operation, control circuits employing such components have required considerable maintenance and often provide service problems of a complexity which cannot be readily handled by ordinary maintenance personnel. As a result, considerable downtime may occur when such apparatus requires service. It is therefore another object of the present invention to remedy this problem by providing a versatile and positive control circuit which includes no electronic components and is therefore relatively easy to maintain.

In accordance with the present invention, there is provided electrode feed apparatus including an electrode drive unit having two pairs of motor driven drive or feed rolls in a novel arrangement to grip and feed consumable electrode toward the work during the welding cycle. Means are provided for adjusting the pressure on the rolls to a desired level for positive drive. The efficiency of the drive unit is such that this pressure may be relatively low so that the electrode is not deformed as it traverses the electrode drive unit. The apparatus is controlled by novel control means including means to precisely control the speed of the feed rolls within narrow limits by governor control of the drive motor. The control means also includes electrical means for rapidly decelerating the electrode drive motor at the end of a weld operation to prevent continued electrode feed due to the inertia in the feeding mechanism. The motor decelerating means includes a relay which operates at the end of a weld period to slow the motor by changing its field winding connection from series to parallel.

The invention, both as to its organization and method of operation, together with further objects and advantages, will best be understood by reference to the following description taken in connection with the accompanying drawings in which:

FIG. 1 is a diagrammatic view illustrating the invention;

FIG. 2 is an elevational view of the drive unit of a preferred form of the invention;

FIG. 3 is a sectional view taken along the line 3—3 of FIG. 2;

FIG. 4 is a fragmentary bottom view of a portion of the drive unit of FIG. 2 illustrating details of one of the pressure arms;

FIG. 5 is a fragmentary sectional view taken along the line 5—5 of FIG. 2;

FIG. 6 is a perspective view of one of the elements of FIG. 2; and

FIG. 7 is an elevational view of a modified form of drive unit.

Referring now more particularly to FIG. 1 of the drawings, the illustrated arrangement includes a conventional welding power supply 10, constituting an electric current power source, which may be connected to suitable power lines 11. Power supply 10 is provided with a pair of output terminals 8 and 9.

A consumable electrode 12 carried on a reel 13 is drawn therefrom by an electrode drive unit 14 to be described in detail below. Upon energization of its associated motor, drive unit 14 feeds electrode 12 through a preferably flexible conduit 16 which is connected to a welding torch 20 which may be of the hand gun type. The welding power supply 10 is connected to torch 20 by a cable 21 which may pass through a suitable control housing (not shown) and through a power in-water out conduit 18 and into torch 20 through its handle 19. The welding current carried by cable 21 is picked up by electrode 12 as it passes through a guide tube (not shown) mounted within torch 20 and electrically connected to cable 21, all in accord with conventional practice. Another cable 22 connects the welding power supply 10 to a work piece 23.

The electrode feed apparatus of the present invention includes an adjustable speed electrode drive motor 24 of the governor type which is controlled by means described in detail below, generally enclosed within a suitable housing (not shown).

The motor 24 and its associated governor components, generally indicated at 25, provide means to precisely select and control the electrode feed rate over a very broad range. The governor components 25 associated with motor 24 may generally be of the type shown in U.S. Patent 2,291,639 and include a centrifugal switch 30 having a pair of contacts 30a and 30b, and a speed-adjusting lever 31, the latter having a free end portion at the axis of the motor and being actuated by an axially extending adjustment screw 32 suitably mounted on the casing (not shown) of the motor 24. The contact 30a is stationary and the contact 30b is movable. By turning screw 32, lever 31 is actuated to control the position of contact 30b relative to contact 30a. The governor components also include a pair of paralleled resistors 33, and a capacitor 34 connected in parallel therewith for smoother motor operation and to minimize contact sparking, all connected in parallel with switch 30. After adjustment screw 32 is appropriately adjusted to obtain the correct contact setting for the desired speed, the contacts 30a and 30b will separate when the motor 24 accelerates to the critical speed. As the contacts 30a and 30b separate, the paralleled resistors 33 are interposed in series with motor 24, reducing its speed. As the motor speed drops slightly below the critical speed, the contacts 30a and 30b re-engage, bridging the paralleled resistors 33, increasing motor speed. In operation, the contacts 30a and 30b may open and close at a relatively high frequency, and, as a result, the adjusted motor speed and thereby the electrode feed rate remains substantially constant at the selected level. In the illustrated embodiment the electrode feed rate can be readily and precisely adjusted to any desired rate within a range of about 55 inches per minute to about 500 inches per minute.

The control means for the feed electrode apparatus of the present invention includes a circuit generally indicated at 35 which is energized from a suitable source, for example, a 115 volt A.C. supply generally indicated at 36 which is connected to lines L–1 and L–2. A line 37 connected to line L–1, in turn, is connected to a weld start-stop trigger switch 40 on the torch handle 19. Switch 40 includes a movable switch blade 41 controlled by a button 42 on handle 19. A line 43 connects the blade 41 to a line 44 which is connected to a fixed contact 45a forming part of a double-pole double-throw inching switch 45. The inching switch 45 includes another fixed contact 45b and a pair of mechanically connected movable switch blades 45c and 45d. The switch 45 is of the snap return type and its blade 45c is normally closed against fixed contact 45a with blade 45d out of engagement with fixed contact 45b. The blade 45c is connected by a line 46 to a terminal (not shown) of a plug 47 adapted for connection to a contactor receptable 48 mounted on the housing of welding power supply 10. Another terminal (not shown) of the plug 47 is connected to a line 50 which, in turn, is connected to line L–2 by a line 51. The receptacle 48 is connected to a conventional contactor (not shown) within welding power supply 10 which controls the energization of the power supply output terminals 8 and 9.

The circuit 35 includes means for preventing energization of the electrode drive motor 24 until the welding circuit is energized consisting of a welding current relay 52 having an operating coil 52a interposed in the line 22 connecting welding power supply 10 to work piece 23. The relay 52 includes a fixed contact 52b connected to trigger switch 40 by line 43. A movable contact 52c, which cooperates with fixed contact 52b, is operated to engage contact 52b on the energization of coil 52a and is connected by lines 53, 54, and 55 to line 51 which, in turn, is connected to line L–2. When welding current in line 22 attains a predetermined desired level, coil 52a will be energized so as to operate relay 52, causing contact 52c to engage contact 52b to complete a circuit permitting the energization of electrode drive motor 24 as described below.

A motor control relay 56 provides electrically operable means to control the motor 24 so that it may be rapidly decelerated concurrently with the termination of welding operation. The relay 56 includes an operating coil 56a interposed in the line 55 which controls the operation of a pair of movable switch contacts or blades 56b and 56c. The contacts 56b and 56c are respectively connected to the terminal ends of a field winding 24a forming part of the motor 24. The relay 56 also includes a pair of fixed contacts 56d and 56e for cooperation with movable contact 56b, and a pair of fixed contacts 56f and 56g for cooperation with movable contact 56c.

When the relay 56 is in its deenergized condition, movable contact 56b is engaged with fixed contact 56e and movable contact 56c is engaged with fixed contact 56g. A line 57 connects fixed contact 56g with one side of armature 24b forming part of the motor 24. The other side of armature 24b is connected by a line 60 to fixed contacts 56e and 56f. When coil 56a is energized, the relay 56 operates to move blades 56b and 56c into engagement with fixed contacts 56d and 56f respectively. As a result, field winding 24a and armature 24b of motor 24 are connected in series. This connection arrangement is utilized for operating motor 24 to drive electrode through drive unit 14 and the circuit can be traced from line L–1, through line 37, switch blade 41, line 43, contacts 52b and 52c, line 53, line 54, blade 56b, through winding 24a, blade 56c, line 60, armature 24b, the contacts of switch 30, line 62, and through line 51 to line L–2.

At the termination of a weld period, the novel circuit arrangement illustrated in FIG. 1 may be operated to modify the electrical connections of the motor 24 so that it rapidly decelerates, preventing further electrode feed by, in effect, connecting motor 24 as a generator. This is accomplished by release of the button 42 opening the circuit between L–1 and operating coil 56a. As a result, coil 56a will be deenergized and blades 56b and 56c will move out of engagement with contacts 56d and 56f and into engagement with contacts 56e and 56g. Motor winding 24a will then be connected in parallel with motor armature 24b with only one end of the motor circuit connected to source 36. This circuit can be traced from L–2 of source 36, back through line 51, line 62, contacts 30a and 30b, armature 24b, line 60, contact 56e, blade 56b, field winding 24a, blade 56c, contact 56g, and line 57 to armature 24b. At this time there will be no connection between motor 24 and line L–1. This change in connection will cause motor 24 to rapidly come to a halt, thereby quickly terminating electrode feed through the wire drive unit. As the parallel circuit including armature 24b and field winding 24a as described is open at one end, the motor 24 cannot pick up speed in the reverse direction. The described connection thus provides means for rapidly decelerating the motor 24 thereby substantially preventing electrode feed after the end of a weld period.

The circuit 35 includes means to inch the electrode 12 without energizing the welding circuit which extends from supply 10, through line 21, electrode 12, work piece 23 and line 22 back to supply 10. The inching means includes the inching switch 45 mentioned above which may be manually operated to place blade 45d into engagement with fixed contact 45b. The circuit to operate relay 56 is then from L–1 through a line 63, blade 45d, line 53, line 54, line 55, through coil 56a, and line 51 to L–2. After inching is completed, on release of switch 45 the snap return feature of switch 45 operates to disengage blade 45d from fixed contact 45b and to engage blade 45c with fixed contact 45a.

The control circuit 35 also includes means for controlling the flow of shielding gas and cooling fluid to the torch 20. As shown in FIG. 1, a solenoid operated valve 64 controls the flow of a shielding gas such as argon, helium, or carbon dioxide through a gas conduit 65 connected to the torch 20 through its handle 19. The upstream end of gas conduit 65 is connected to a suitable shielding gas source (not shown). A water conduit 66 connected to a suitable cooling water source (not shown) also enters the torch handle 19 and is controlled by a solenoid operated valve 70. When trigger switch 40 is operated to connect blade 41 with line 37, the solenoid valves 64 and 70 are energized by a circuit which extends from line L–1, through line 37, blade 41, line 43, a line 71, through solenoid 70, and through a line 72, connected to L–2 by line 51. Energization of solenoid 64 is by way of line L–1 through line 37, blade 41, line 43, and a line 74 to solenoid 64, and then through a line 73 to line 72, and then to line 51 and L–2.

Referring now in detail to FIGS. 2, 3, 4, 5, and 6, the electrode drive unit 14 shown therein may include a suitable housing 80 substantially enclosing a pair of electrode drive rolls 81 and 82 carried on shafts 93 and 94, and a pair of drive rolls 95 and 96 respectively carried by a pair of hinged pressure arms 90 and 91. As shown in FIG. 2, the roll 81 is aligned with roll 95 carried on the opposite side of the electrode 12 to form a first set of feed rolls. Similarly, a second set of feed rolls is formed by rolls 82 and 96 which are aligned on opposite sides of electrode 12 downstream of the set including rolls 81 and 95. The drive rolls are of metal and may advantageously be provided with U-shaped grooves 89. However, it will be recognized that the drive rolls may be provided with rubber tires, or they may be of metal with a knurled surface as best suited to the type of electrode used for a particular welding application. The drive unit 14 is also provided with left, center and right electrode guides 100, 101, and 102, respectively, to position the electrode 12 coming from the reel 13 with respect to the drive rolls of drive unit 14 as best shown in FIG. 2. The pressure arm 90 is hinged or pivoted about an axis through a pin 103 mounted on the left side of the drive unit 14 as shown in FIG. 2. Similarly, the pressure arm 91 is pivoted about an axis through a pin 104 mounted on the right side of the drive unit 14 as shown in FIG. 2. The free ends 105 and 106 of the pressure arms 90 and 91, respectively, are provided with U-shaped notches 109 so that the free ends may partially encircle an adjustment screw 107 (see FIG. 5) disposed in a tapped hole in drive unit 14 intermediate the pressure arms 90 and 91. Pressure on the electrode 12 is applied and adjusted by means of the adjustment screw 107, a suitable coil spring 108 encircling screw 107 below its head portion, and a washer 110 (see FIGS. 2 and 6) interposed between spring 108 and the pressure arm ends 105 and 106. As described, the pressure on the electrode 12 can thus be adjusted by a single adjusting member consisting of the screw 107. It will be recognized that the contact pressure of the drive rolls on the electrode will be relatively low because of the large contact area presented to the electrode by the two sets of drive rolls. As a result, there is substantially no deformation of the electrode 12 as it traverses the drive unit 14. Drive unit 14 also provides an efficient means to straighten the electrode 12 as it traverses the drive unit. As the electrode 12 passes through the drive unit electrode guides 100, 101, and 102 and through the two sets of drive rolls, the electrode becomes substantially straight and there is thus no need for a conventional wire straightener.

Referring now to FIG. 3, the wire drive unit 14 includes a conventional gear train generally indicated at 115 operatively connected to motor 24 by a motor output shaft 116. The gear train 115 includes a drive gear 117 carried on shaft 116 which is in driving relationship with a pair of driven gears 120 and 121 carried on the drive shafts 93 and 94. The gear train 115 is also provided with suitable bearings including the bearings 119, 122, 123, 124, and 125. A pair of drive roll gears 126 and 127 are respectively carried on the drive shafts 93 and 94. The drive roll gears 126 and 127 cooperate with a pair of pressure arm drive roll gears 130 and 131 respectively carried on the pressure arms 90 and 91. When adjustment screw 107 is tightened against the spring 108 to apply suitable pressure to the electrode 12, the gears 130 and 131 are respectively in driving relationship with gears 126 and 127. Therefore, drive rolls 81, 82, 95 and 96 are all in driving relationship with the electrode 12. The drive gears 126, 127, 130 and 131 thus provide a means for applying driving force to the electrode through both sets of drive rolls. This arrangement results in a positive electrode drive with relatively low contact pressure per drive roll because of the use of the two sets of drive rolls.

Referring now to FIG. 7, there is shown therein a modified form of drive unit 135 which is generally similar to drive unit 14 in that it is provided with two sets of drive rolls. Drive unit 135 includes a pair of hinged pressure arms 136 and 137 which are hinged or pivoted about an axis through a pivot pin 138 which is common to both pressure arms. The pivot pin 138 is mounted intermediate the drive rolls carried within the pressure arms 136 and 137. Pressure is applied to the electrode by tightening the adjusting screws 140 and 141 against the coil springs 142 and 143 interposed beneath the heads of the screws 140 and 141 respectively and the pressure arms 136 and 137. The gear train associated with drive unit 135, the electrode guides, and other details are substantially the same as those described above in connection with drive unit 14. It will be recognized that the modification illustrated in FIG. 7 is advantageous in that it permits individual pressure adjustment with respect to each of the hinged pressure arms.

While there has been described what is at present considered to be the preferred embodiment of the invention, it will be understood that various modifications may be made therein and are intended to be included within the scope of the appended claims.

What is claimed is:

1. In arc welding apparatus, means for feeding an electrode to a torch, an electrode drive motor having an armature and a field winding to drive the feeding means, a circuit for connecting the motor to a power source, control means in said circuit including means controlling the energization of said circuit, means to selectively adjust the speed of said motor, and means to quickly decelerate said motor concurrently with the deenergization of said circuit, said decelerating means including switch means arranged to connect the armature of said motor in series relation with its field winding concurrently with the energization of said circuit, and to open the circuit connecting said motor to said source while connecting the armature of said motor in parallel relation with its field winding concurrently with the deenergization of said circuit, whereby the motor cannot pick up speed in the reverse direction.

2. In arc welding apparatus as claimed in claim 1, in which the circuit includes a pair of welding current relay operated contacts engageable on the energization of said electrode, whereby said electrode drive motor cannot be energized until the welding current attains a predetermined desired level.

3. In arc welding apparatus, means for feeding an electrode to a torch, an electric motor to drive the electrode feeding means, a circuit for connecting the motor to a power source, control means in said circuit including switch means controlling the energization of said circuit, means to selectively adjust the speed of said motor, and means to quickly decelerate said motor on the deenergization of said circuit, said decelerating means including a relay in said circuit to connect said motor as a generator in open circuit relation with said power source on the deenergization of said circuit, whereby the motor cannot pick up speed in the reverse direction.

4. In an arc welding apparatus having a source of welding power connected to a consumable electrode and a work piece and adapted to establish an electric arc therebetween, a drive unit to propel an electrode from an electrode source through a welding torch to the work piece, said drive unit having a first pair of drive rolls disposed on one side of said electrode and in engagement therewith, a pair of pressure arms pivotally mounted on the other side of said electrode, a second pair of drive rolls respectively carried by said pressure arms, the pivotal axes of said pressure arms being common to each of them and intermediate said second pair of drive rolls, each of said second pair of drive rolls being opposite to and in alignment with respective ones of said first pair of drive rolls, said pressure arms being adapted for movement about their pivotal axes to move said second pair of drive rolls into engagement with said electrode, means to bias at least two of said drive rolls into engagement with said electrode, and means for rotatably driving at least one of said pairs of drive rolls, said driving means including a motor and control means for said motor, said control means including switch means for decelerating said motor by interrupting its energization and connecting it to operate as a generator.

5. Arc welding apparatus comprising a source of welding electrode, a welding torch, means for feeding the electrode through said torch to a welding zone, a welding current source, means including a welding circuit for connecting said electric current source to said welding torch, an electric motor having an armature winding and a field winding to drive the feeding means, a circuit connecting the motor to a power source, means for selectively controlling the motor speed including a pair of contacts in said motor circuit, one of said contacts being movable relative to the other, a switch in said motor circuit, means to slow the motor's rotational speed when said switch is moved from closed to open circuit position, said motor slowing means including a relay coil in series with said switch and a pair of switches operated by the energization of said relay coil, said relay operated switches connecting said motor armature winding in series with its field winding when said coil is energized, and in parallel with its field winding when said coil is deenergized, and means including a relay for preventing the energization of said motor circuit until the energization of said welding circuit.

6. In arc welding apparatus wherein a consumable electrode is fed toward a work piece, a welding power source, a consumable electrode, an arc welding torch for receiving said consumable etlectrode and directing it toward a work piece, a welding circuit connecting said power source to said consumable electrode and a work piece, a current relay in said welding circuit, means for feeding the electrode to the torch, said feeding means including at least one pair of drive rolls disposed one on each side of the electrode, an electric motor to drive the electrode feeding means, a motor circuit connecting the motor to a power source, and control means in said motor circuit including means to rapidly decelerate said motor at the termination of a welding operation, a pair of contacts controlling the energization of said motor operated by said current relay whereby said motor cannot be energized until a current sufficient to operate said current relay energizes said welding circuit, and a switch for bypassing said current relay contacts whereby said motor may be operated to feed the electrode to the torch without energizing said welding circuit.

7. In arc welding apparatus, an arc welding torch, a consumable electrode, a shielding gas source, means for feeding electrode to the torch, an electric motor to drive the electrode feeding means, said motor including an armature and a field winding, a circuit connecting the motor to a power source, control means in said circuit including means to adjust the speed of said motor, means to control the delivery of shielding gas to the arc during a welding operation, and electrically operable means to rapidly decelerate said motor at the termination of a welding operation comprising means for changing the field winding connection from series to parallel relation with said armature and opening a portion of the circuit connecting said motor to said source, whereby the motor cannot pick up speed in the reverse direction.

8. In arc welding apparatus, a welding electrode, a welding torch, an electrode drive unit including two pairs of rotatable electrode feed rolls mounted on opposite sides of said electrode to propel said electrode through said torch to a welding zone, the rolls on at least one side of the electrode being laterally movable relative to the rolls on the other side, said movable rolls being pivotally mounted about a common axis intermediate said movable rolls, biasing means respectively urging said movable feed rolls about said common axis into operative engagement with said electrode, the biasing means for the respective movable feed rolls permitting individual adjustment of the movable feed rolls at spaced locations along said electrode, and means for rotatably driving at least two of said electrode feed rolls, said driving means including a motor having an armature winding and a field winding and control means for said motor, said control means including means to rapidly decelerate said motor at the end of a weld period by opening its connection to its source and modifying the motor armature and field winding connections from series to parallel.

9. In arc welding apparatus, an arc welding torch, an electrode, means for feeding the electrode to the torch, an electric motor having an armature winding and a field winding to drive the electrode feeding means, a circuit connecting the motor to a power source, a start-stop switch controlling the motor circuit, and means to rapidly halt electrode feed effective when said start-stop switch moves from closed to open circuit position, said electrode feed halting means including a relay coil in series with said start-stop switch, and a pair of double pole double throw switches operated by the energization of said coil, said relay coil operated switches connecting said motor armature winding in series relation with its field winding with said motor in a closed circuit including said power source when said start-stop switch is in closed circuit position, and said relay operated switches connecting said motor armature winding in parallel with said field winding and opening the circuit connecting said motor to said power source when said start-stop switch is in open circuit position.

10. Arc welding apparatus comprising a welding torch, means for feeding an electrode through said torch to a welding zone, means including a welding circuit for connecting an electric current source to said welding torch, an electric motor having an armature winding and a field winding to drive the feeding means, a motor circuit for connecting the motor to a power source, means in said motor circuit for selectively controlling the motor speed including a switch, means to slow the motor's rotational speed when said switch is moved from closed to open position, said motor slowing means including a relay coil in series with said switch and a pair of switches operates by the energization of said relay coil, said relay operated switches connecting said motor armature winding in series with said field winding in a closed circuit with a power source when said coil is energized, and connecting said motor armature winding in parallel with said field winding and opening the circuit for connecting said motor to a power source when said coil is deenergized, and means including a relay for preventing the energization of said motor circuit until said welding circuit is energized.

References Cited in the file of this patent

UNITED STATES PATENTS

| | | |
|---|---|---|
| 2,032,260 | Chapman | Feb. 25, 1936 |
| 2,272,158 | Anderson | Feb. 3, 1942 |
| 2,291,639 | Lee | Aug. 4, 1942 |
| 2,681,401 | Anderson | June 15, 1954 |
| 2,719,245 | Anderson | Sept. 27, 1955 |
| 2,784,366 | Steele | Mar. 5, 1957 |
| 2,823,331 | Bichsel et al. | Feb. 11, 1958 |
| 2,906,859 | Steele | Sept. 29, 1959 |
| 2,909,646 | Russell | Oct. 20, 1959 |
| 2,929,910 | Kennedy | Mar. 22, 1960 |
| 2,931,890 | Bernard | Apr. 5, 1960 |